US012611904B2

(12) United States Patent
    Koumura

(10) Patent No.:  US 12,611,904 B2
(45) Date of Patent:       Apr. 28, 2026

(54) VEHICLE HEIGHT CONTROL DEVICE

(71) Applicant: TOYOTA JIDOSHA KABUSHIKI KAISHA, Toyota (JP)

(72) Inventor: Shingo Koumura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 21 days.

(21) Appl. No.: 18/663,304

(22) Filed: May 14, 2024

(65) Prior Publication Data

US 2024/0383296 A1     Nov. 21, 2024

(30) Foreign Application Priority Data

May 17, 2023     (JP) ................................. 2023-081711

(51) Int. Cl.
    B60G 17/015       (2006.01)
    B60G 17/016       (2006.01)
(52) U.S. Cl.
    CPC ....... B60G 17/0152 (2013.01); B60G 17/016 (2013.01)
(58) Field of Classification Search
    CPC .............. B60G 17/0152; B60G 17/016; B60G 2400/252; B60G 2500/30; B60G 17/015; B60G 17/018
    See application file for complete search history.

(56) References Cited

U.S. PATENT DOCUMENTS

| | | | |
|---|---|---|---|
| 2008/0023927 A1* | 1/2008 | Kim ................... | B60G 17/0155 |
| | | | 280/5.514 |
| 2014/0084556 A1 | 3/2014 | Kasuga et al. | |
| 2021/0039493 A1* | 2/2021 | Oh ........................... | B60K 1/00 |
| 2021/0387496 A1* | 12/2021 | Park ................... | B60G 17/0165 |
| 2023/0093748 A1* | 3/2023 | Kim ................... | B60G 17/0195 |
| | | | 701/37 |

FOREIGN PATENT DOCUMENTS

| | | |
|---|---|---|
| DE | 42 10 536 A1 | 10/1993 |
| DE | 10 2013 204 486 A1 | 3/2014 |
| JP | 2009-40349 A | 2/2009 |

* cited by examiner

*Primary Examiner* — Long T Tran
*Assistant Examiner* — Charles J Brauch
(74) *Attorney, Agent, or Firm* — Sughrue Mion, PLLC

(57)                ABSTRACT
A vehicle height control device applied to a vehicle equipped with a wheel that is rotatably supported about a rotational axis and has a tire, and a drive system that drives the wheel via a transmission by an engine, in which a suspension arm is arranged between a wheel carrier and a vehicle body so that the rotational axis when viewed in the lateral direction of the vehicle draws a locus inclined backward as the wheel moves up and down, the vehicle height control device includes a vehicle height adjustment device and an electronic control device that controls the vehicle height adjustment device, and the electronic control device acquires information on an index indicating an equivalent moment of inertia of the drive system, and controls the vehicle height adjustment device such that the smaller the equivalent moment of inertia indicated by the index, the lower the vehicle height.

5 Claims, 11 Drawing Sheets

VEHICLE HEIGHT CONTROL DEVICE

CROSS-REFERENCE TO RELATED APPLICATION

This application claims priority to Japanese Patent Application No. JP2023-081711 filed on May 17, 2023, the content of which is hereby incorporated by reference in its entirety into this application.

BACKGROUND

1. Technical Field

The present disclosure relates to a vehicle height control device for a vehicle such as an automobile.

2. Description of the Related Art

A suspension is known that improves ride comfort of a vehicle by reducing a longitudinal force acting on a wheel due to vertical input from a road surface. For example, in Japanese Patent Application Laid-open No. 2009-040349, a suspension is described in which a suspension arm is arranged so that a rotational axis of a wheel draws a locus inclined backward as the wheel moves up and down when viewed in a lateral direction of a vehicle, and a shock absorber is arranged so that it is inclined forward.

According to this type of suspension, a longitudinal force acting on the wheel due to vertical input from a road surface can be at least partially offset by a longitudinal force generated by the backward inclination of the locus of the rotational axis and a longitudinal force generated by a damping force of the shock absorber, which makes it possible to reduce a longitudinal force of the wheel.

In a vehicle that has a drive system in which a wheel is rotationally driven by a drive source via a transmission, when a torsional resonance frequency of the drive system approaches a vertical resonance frequency of a suspension, longitudinal vibration caused by a longitudinal force of the wheel becomes significant. As will be explained in detail later, the torsional resonance frequency of the drive system is determined by a moment of inertia and torsional rigidity of the drive system, and the moment of inertia of the drive system varies as a gear ratio of the transmission changes. Therefore, the longitudinal force acting on the wheel due to vertical input from the road surface changes with changes in the moment of inertia of the drive system, and therefore changes with changes in the gear ratio of the transmission.

The suspension described in the above publication cannot cope with fluctuation in a longitudinal force acting on a wheel due to fluctuation in a moment of inertia of a drive system. Therefore, it is not possible to effectively reduce the longitudinal force acting on the wheel due to vertical input from the road surface irrespective of fluctuation in the moment of inertia of the drive system due to change in a gear ratio of a transmission.

SUMMARY

The present disclosure provides an improved vehicle height control device that is capable of effectively reducing a longitudinal force acting on a wheel due to vertical input from a road surface, even if an equivalent moment of inertia of a drive system changes due to changes in a gear ratio of a transmission.

According to the present disclosure, a vehicle height control device is provided which is applied to a vehicle equipped with a wheel that is rotatably supported about a rotational axis by a wheel carrier and has a tire, a drive system that rotationally drives the wheel by a drive source via a transmission, and a suspension arm that is arranged between the wheel carrier and a vehicle body.

The suspension arm is arranged so that the rotational axis, when viewed in the lateral direction of the vehicle, draws a locus that is inclined backward as the wheel moves up and down; the vehicle height control device includes a vehicle height adjustment device configured to change a vehicle height, and an electronic control unit that controls the vehicle height adjustment device, the electronic control unit is configured to acquire information on an index indicating an equivalent moment of inertia of the drive system, and control the vehicle height adjustment device such that the smaller the equivalent moment of inertia indicated by the index, the lower the vehicle height.

According to the above configuration, since the rotational axis of the wheel draws a locus inclined backward as the wheel moves up and down, as will be explained in detail later, a longitudinal force acting on the wheel due to vertical input from a road surface is at least partially offset by a longitudinal force generated by the backward inclination of the locus. The longitudinal force that acts on the wheel due to vertical input from the road surface fluctuates as the equivalent moment of inertia of the drive system changes, but the vehicle height adjustment device is controlled such that the smaller the equivalent moment of inertia, the lower the vehicle height.

Therefore, as will be explained in detail later, the longitudinal force generated by the backward inclination of the locus can be changed in accordance with the change in the longitudinal force acting on the wheel due to the change in the equivalent moment of inertia of the drive system. Accordingly, even if the equivalent moment of inertia of the drive system changes, the longitudinal force acting on the wheel can be effectively reduced.

In one aspect of the present disclosure, an angle of the backward inclination of the locus is set such that a first longitudinal force acting on the wheel due to vertical input from a road surface is at least partially offset by a second longitudinal force generated by the backward inclination of the locus, and the electronic control device is configured to control the vehicle height adjustment device such that a change in the angle of backward inclination of the locus necessary to offset a change in the first longitudinal force due to a change in the equivalent moment of inertia by a change in the second longitudinal force is achieved by a change in the vehicle height.

In another aspect of the present disclosure, the electronic control device stores a relationship between a target vehicle height and the index for achieving, by controlling the vehicle height, a change in the backward inclination angle of the locus that is necessary to offset a change in the first longitudinal force due to a change in the equivalent moment of inertia by a change in the second longitudinal force.

Further, in another aspect of the present disclosure, the index is a gear ratio of the transmission, and the relationship is a relationship between a target vehicle height and a gear ratio of the transmission which is set such that the smaller the gear ratio of the transmission, the lower the target vehicle height.

Further, in another aspect of the present disclosure, the transmission is a multi-stage transmission, the index is a gear stage of the transmission, and the relationship is a relationship between a target vehicle height and a gear stage of the transmission which is set such that the higher the gear stage of the transmission, the lower the target vehicle height.

Other objects, other features and attendant advantages of the present disclosure will be readily understood from the description of the embodiments of the present disclosure described with reference to the following drawings.

4

Figure 14:
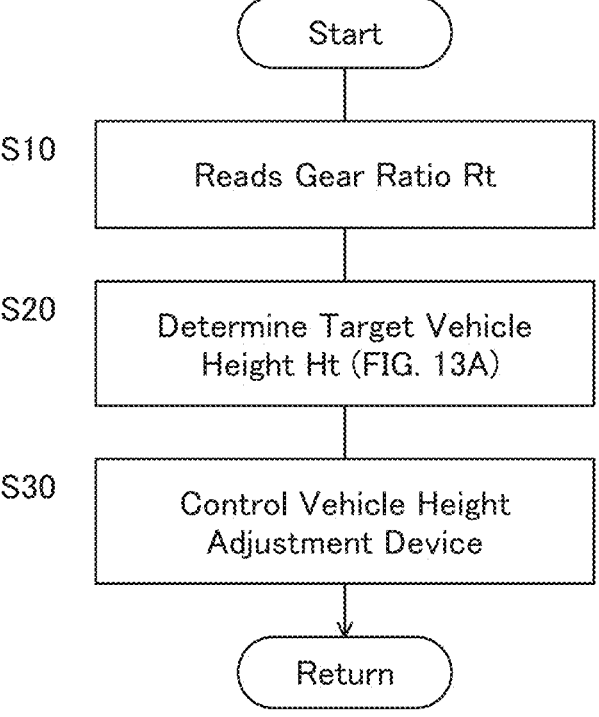

FIG. 14 is a flowchart corresponding to a vehicle height control program of the embodiment.

DETAILED DESCRIPTION

The present disclosure will now be described in detail with respect to an embodiment with reference to the accompanying drawings.

Embodiment

Figure 1:
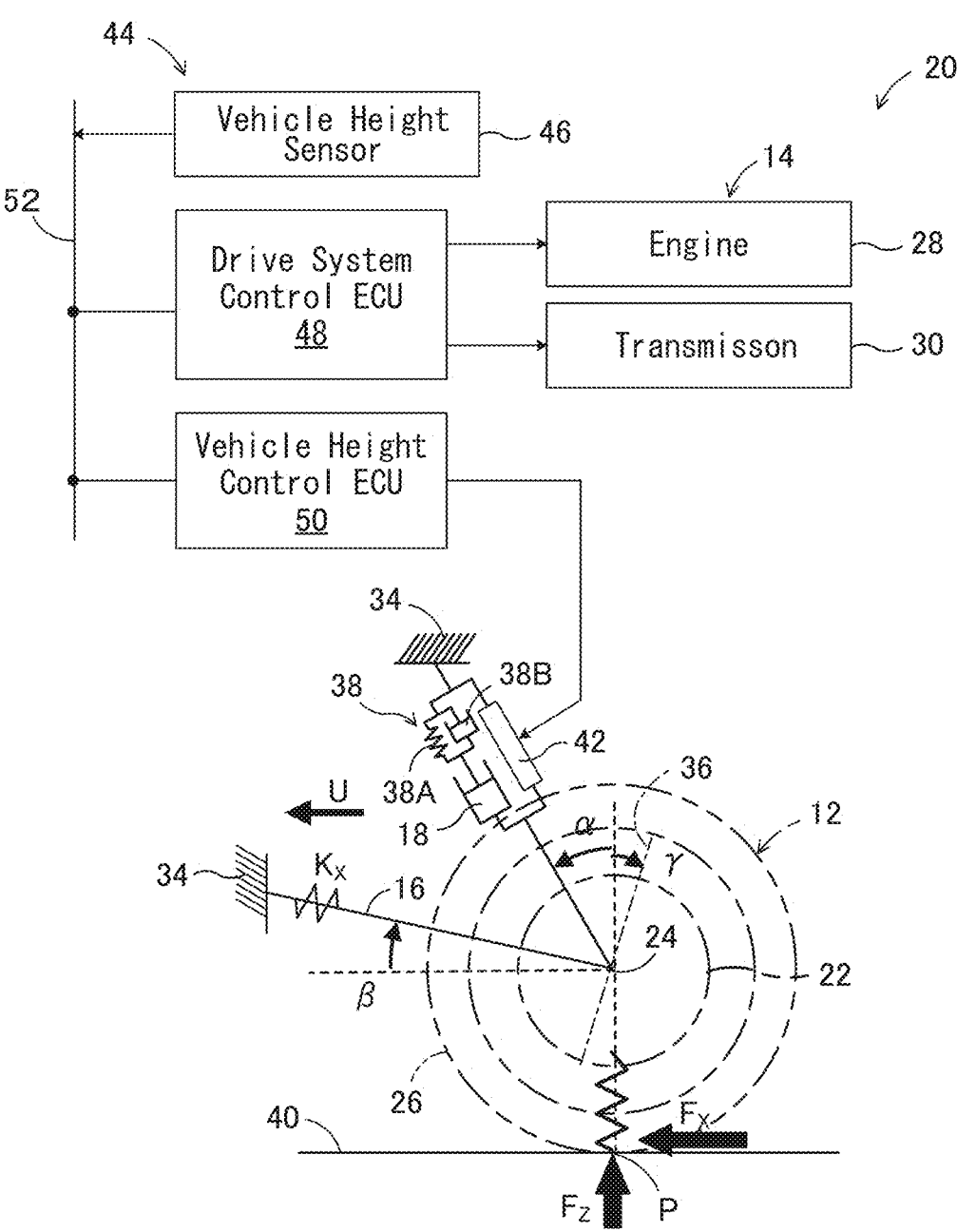
FIG. 1 is a schematic configuration diagram showing an embodiment of a vehicle height control device according to the present disclosure.
Figure 2:
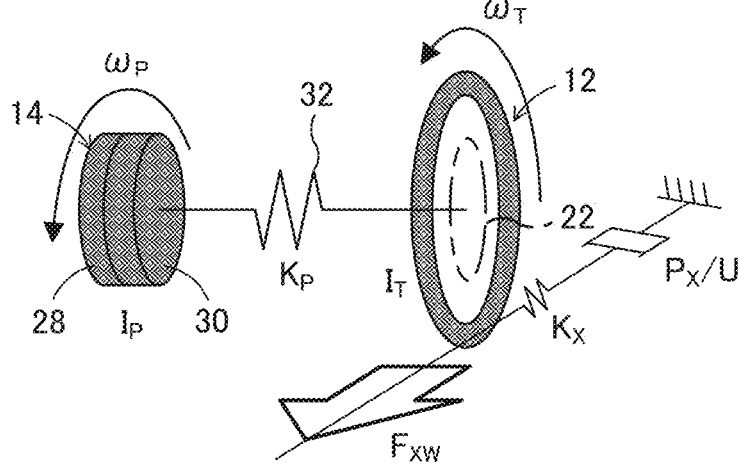
FIG. 2 is an explanatory diagram showing a wheel driven by a drive system.

As shown in FIGS. 1 and 2, the vehicle height control device 10 according to the embodiment of the present disclosure is applied to a vehicle 20 that includes a wheel 12, a drive system 14, a suspension arm 16, and a shock absorber 18. The vehicle 20 may be a vehicle capable of automatic driving. The wheel 12 is rotatably supported about a rotational axis 24 by a wheel carrier 22 and has an elastically deformable tire 26, as is well known. The drive system 14 is configured to rotationally drive the wheel 12 via a transmission 30 and a drive shaft 32 using an engine 28 as a drive source. The suspension arm 16 and the shock absorber 18 are arranged between the wheel carrier 22 and a vehicle body 34.

Although only one suspension arm is shown in FIG. 1, the suspension arm may include a plurality of arms, links, etc. and the suspension arm 16 is shown as a suspension arm equivalent to a plurality of arms, links, etc. when viewed from the side of the vehicle 20. The drive source may be any drive source known in the art other than an engine. Further, in the embodiment, the transmission 30 is a continuously variable transmission, but it may be a multi-stage transmission such as a gear type transmission.

The suspension arm 16 is connected to the wheel carrier 22 and the vehicle body 34 so that the rotational axis 24 draws a locus 36 inclined backward at an angle $\gamma$ with respect to the vertical direction as the wheel 12 moves up and down when viewed in the lateral direction of the vehicle 20. The end of the suspension arm 16 on the vehicle body 34 side is located at a position higher than the end on the wheel carrier 22 side. Considering a situation where the wheel 12 is at a neutral position of vertical displacement, an inclination angle of the suspension arm 16, that is, an angle that a straight line connecting both the ends makes with the horizontal direction is $\beta$. Note that the locus 36 does not have to be a straight line, and the angle $\gamma$ of the backward inclination of the locus 36 may be considered to be the same as the inclination angle $\beta$ within a range of vertical displacement of the wheel 12 as the vehicle 20 travels.

The shock absorber 18 is disposed between the wheel carrier 22 and the vehicle body 34 in a forward inclined state, and a forward inclination angle, that is, an angle that a main axis (not shown) of the shock absorber makes with the vertical direction is $\alpha$. The shock absorber 18 has an upper end connected to the vehicle body 34 via an upper support 38 and a lower end connected to the wheel carrier 22. The upper support 38 functions as a spring 38A and a damper 38B.

The backward inclination angle $\gamma$ of the locus 36 and the forward inclination angle $\alpha$ of the shock absorber are set such that a longitudinal force $F_{X1}$ that acts on the wheel 12 at a ground contact point P due to a vertical input from a road surface 40 is at least partially offset by a longitudinal force $F_{X2}$ generated by the backward inclination of the locus 36 and a longitudinal force $F_{X3}$ generated by a damping force of the shock absorber.

Figure 3A:
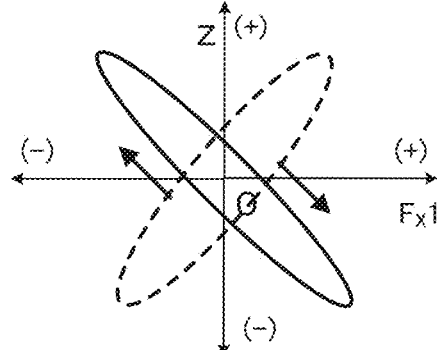
FIG. 3A is a diagram showing an example of a relationship between a vertical displacement Z of a wheel and a longitudinal force $F_{X1}$.
Figure 3B:
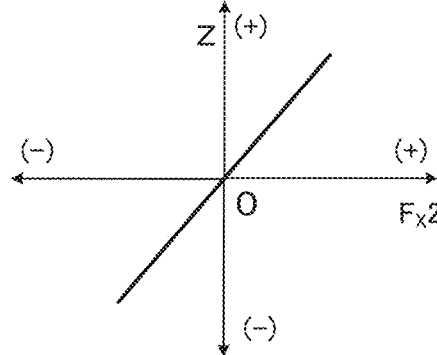
FIG. 3B is a diagram showing an example of a relationship between a vertical displacement Z of the wheel and a longitudinal force $F_{X2}$.
Figure 3C:
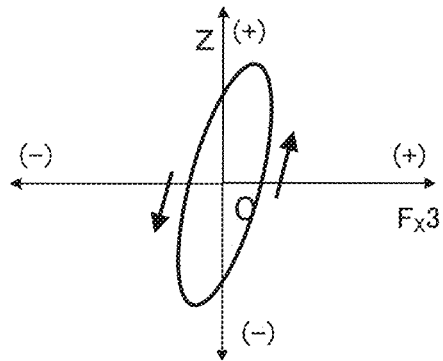
FIG. 3C is a diagram showing an example of a relationship between a differential value of the vertical displacement Z of the wheel and a longitudinal force $F_{X3}$.

For example, FIG. 3A shows an example of a relationship between the vertical displacement Z of the wheel 12 as an unsprung and the longitudinal force $F_{X1}$. The longitudinal force $F_{X1}$ assumes a negative value when the vertical displacement Z is positive (upward displacement). FIG. 3B shows an example of a relationship between the vertical displacement Z of the wheel 12 and the longitudinal force $F_{X2}$. The longitudinal force $F_{X2}$ assumes a positive value when the vertical displacement Z is positive, and is proportional to the vertical displacement Z. FIG. 3C shows an example of a relationship between the vertical displacement Z of the wheel 12 and the longitudinal force $F_{X3}$. The longitudinal force $F_{X3}$ assumes a positive value when a differential value of the vertical displacement Z, that is, an upward displacement speed of the wheel 12 is positive, and is substantially proportional to the displacement speed.

A sum of the longitudinal forces $F_{X2}$ and $F_{X3}$ is the value shown by the broken line in FIG. 3A. Therefore, the longitudinal force $F_{X1}$ can be at least partially offset by the sum of the longitudinal forces $F_{X2}$ and $F_{X3}$. It is to be noted that in FIGS. 3A and 3C, arrows indicate directions of changes in the longitudinal forces $F_{X1}$ and $F_{X2}$ due to the vertical displacement of the wheel 12.

A suspension spring 42 is also arranged between the wheel carrier 22 and the vehicle body 34. In particular, in the embodiment, the suspension spring 42 is an air spring having a vehicle height adjustment function, and functions as a vehicle height adjustment device configured to change the vehicle height. Therefore, in this Description, the suspension spring 42 is referred to as a vehicle height adjustment device 42 as necessary. Note that the suspension spring may be, for example, a spring such as a coil spring, and the vehicle height adjustment device may be any vehicle height adjustment device known in the art independent of the suspension spring.

The vehicle height control device 10 includes an electronic control device 44 that controls the vehicle height adjustment device 42. The electronic control device 44 includes a vehicle height sensor 46, a drive system control ECU 48, and a vehicle height control ECU 50. Each ECU is an electronic control unit that includes a microcomputer as a main part. The vehicle height sensor 46 detects a vehicle height H as the vertical distance between a reference position (not shown) of the vehicle body 34 and the rotation axis 24.

The microcomputer of each ECU includes a CPU, a ROM, a RAM, a readable/writable nonvolatile memory (N/M), an interface (I/F), and the like. The CPU implements various functions by executing instructions (programs, routines) stored in the ROM. Further, these ECUs and sensors such as the vehicle height sensor 46 are communicably connected to each other via a CAN (Controller Area Network) 52.

The drive system control ECU 48 controls an output torque T of the drive system 14 and, therefore, a drive torque applied to a wheel 12 by controlling an output of the engine 28 and a transmission ratio (gear ratio) Rt of the transmission 30. The drive system control ECU 48 outputs a signal indicating the gear ratio Rt of the transmission 30 to the vehicle height control ECU 50 via the CAN 52. The gear ratio Rt is an index indicating an equivalent moment of inertia $I_P$ of the drive system 14, and the equivalent moment of inertia $I_P$ is a product of a sum of equivalent moments of inertia of each individual component of the transmission 30 and a square of the gear ratio Rt. Therefore, it is proportional to the square of the gear ratio Rt.

As will be described in detail later, the longitudinal force $F_{X1}$ acting on the wheel 12 at the ground contact point P due to vertical input from the road surface 40 changes in accordance with changes in the equivalent moment of inertia $I_P$ of the drive system 14. Therefore, the vehicle height control ECU 50 acquires information on the gear ratio Rt as an index indicating the equivalent moment of inertia $I_P$ of the drive system 14, and controls the vehicle height adjustment device 42 so that the smaller the equivalent moment of inertia indicated by the index, the lower the vehicle height H. In particular, the vehicle height control ECU 50 controls the vehicle height adjustment device 42 such that a change in the angle $\gamma$ of the backward inclination of the locus 36, which is necessary to offset the change in the longitudinal force $F_{X1}$ due to the change in the equivalent moment of inertia $I_P$ by the longitudinal force $F_{X2}$ generated by the backward inclination of the locus, is achieved by a change in the vehicle height H.

Principle of Vehicle Height Control of Present Disclosure Adopted in Embodiment In order to facilitate understanding of the present disclosure and the embodiment, the principle of vehicle height control in the present disclosure will be explained.

It is assumed that the longitudinal force $F_{X1}$ acting on the wheel 12 at the grounding point P due to the vertical input from the road surface 40 is a sum of a longitudinal force $F_{XT}$ (FIG. 4) acting on the wheel 12 due to a slope of the road surface 40 and a longitudinal force $F_{XS}$ (FIG. 5) that acts on the wheel 12 due to slip of the wheel.

Figure 4:
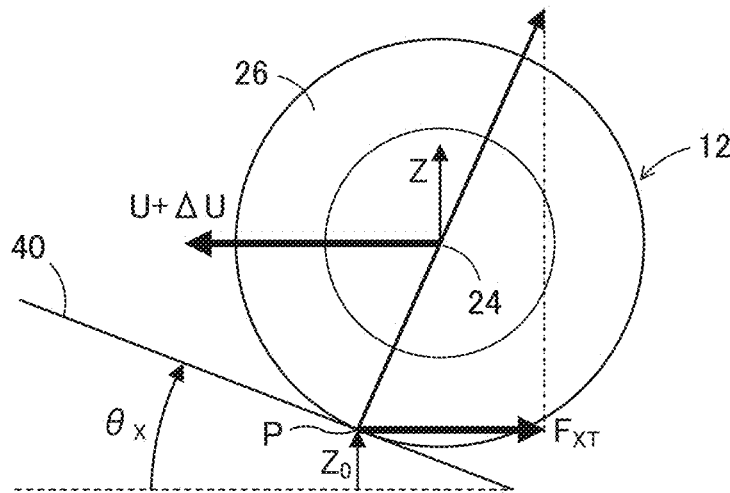
FIG. 4 is a diagram showing a longitudinal force $F_{XT}$ that acts on a wheel due to a slope of a road surface.

As shown in FIG. 4, an inclination angle of the road surface 40 is represented by $\theta X$, and a ground load of the wheel 12 is represented by W (not shown). A steady component of a longitudinal speed of the wheel 12 is represented by U, a fluctuating component of the longitudinal speed of the wheel 12 is represented by $\Delta U$, and a vertical displacement of the road surface 40 is represented by $Z_0$. The longitudinal force $F_{XT}$ is expressed by the following equation (1).

$$F_{XT} = -W \tan \theta_X \qquad (1)$$

$$= -W \frac{\dot{Z}_0}{U + \Delta U}$$

Figure 5:
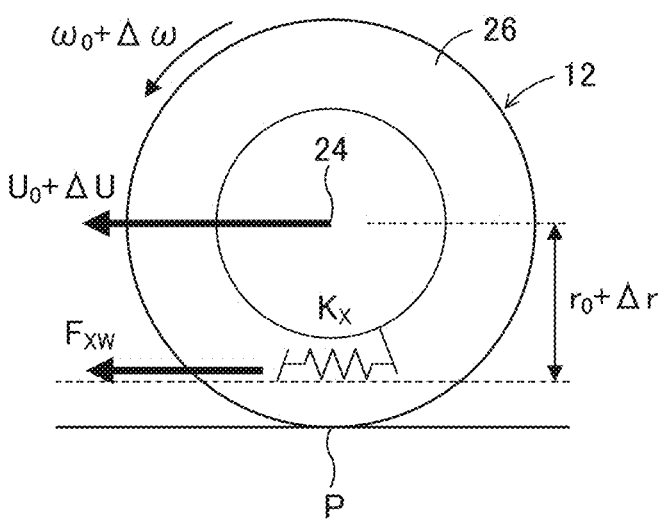
FIG. 5 is a diagram for explaining a longitudinal force $F_{XS}$ acting on a wheel due to wheel slip.

As shown in FIGS. 2 and 5, a driving stiffness is represented by $P_X$, and a slip rate of the wheel 12 is represented by $S_X$ (not shown). A radius (steady component) of the tire 26 is represented by $r_0$, and a fluctuating component of a rolling radius of the tire 26 is represented by $\eta \Delta r$. Note that $\eta$ is a ratio of an amount of variation in the rolling radius to an amount of vertical deformation of the tire. A steady component and a fluctuating component of a rotational angular velocity of the wheel 12 are represented by $\omega 0$ and $\Delta \omega$, respectively. A longitudinal force acting on the wheel at the grounding point P due to a drive torque applied to the wheel 12 is represented by $F_{XW}$, a longitudinal spring constant of the tire 26 is represented by $K_X$, and a Laplace operator is represented by s. The longitudinal force $F_{XS}$ is expressed by the following equation (2).

$$F_{XS} = P_X S_X \quad (2)$$

$$= P_X \left\{ \frac{(r_0 + \mu \Delta r)(\omega_0 + \Delta \omega) - F_{Xw} s / K_X}{U + \Delta U} - 1 \right\}$$

Representing respectively a rotational angular velocities of the drive system 14 and the wheel 12 by $\omega_P$ and $\omega_T (= \omega_0 + \Delta \omega)$, and representing a torsional rigidity of the drive shaft 32 by $K_P$, the following equation (3) holds true as the equation of motion in the rotational direction of the drive system 14.

$$I_P \omega_P s = -K_P \left( \frac{\omega_P}{s} - \frac{\omega_T}{s} \right) \quad (3)$$

Representing an equivalent moment of inertia of the wheel 12 by $I_T$, the following equation (4) holds true as a motion equation in the rotational direction of the wheel.

$$I_T \omega_T s = -F_{Xw} r_0 + K_P \left( \frac{\omega_P}{s} - \frac{\omega_T}{s} \right) \quad (4)$$

By determining the longitudinal force $F_{Xw}$ from the above equations (3) and (4) and substituting it into the above equation (2), the longitudinal force $F_{X1}$ acting on the wheel 12 is expressed by the following equation (5).

$$F_{X1} = F_{XT} + F_{XS} \quad (5)$$

$$= h'(s) \left\{ -\frac{W}{U} \dot{Z}_0 + \frac{P_X \omega_0 \eta}{U} (Z - Z_0) - \frac{P_X}{U} \dot{X} \right\}$$

In equation (5), h'(s) is a term of dynamic characteristics, and the terms in curly braces are terms of steady characteristics. Influence of the first and third terms of the steady characteristic terms on the longitudinal force $F_{X1}$ is smaller than that of the second term. Therefore, if the first and third terms are omitted, h'(s) is expressed by the following equation (6).

$$h'(s) \cong \frac{U K_X s}{P_X} \frac{\left( s^2 \frac{I_T + I_P}{I_T I_P} K_P \right)}{\left( s^2 + \frac{K_P}{I_P} \right) \left( s^2 + \frac{U K_X}{P_X} s + \frac{K_X r_0^2}{I_T} \right)} \quad (6)$$

$$= \frac{U K_X}{P_X} \frac{s^2 + \omega_D^2}{\left( s^2 + \omega_E^2 \right) \left( s^2 + 2 \zeta_W \omega_W s + \omega_W^2 \right)}$$

Notably, in equation (6), $\omega_E$ is a resonance frequency of the rotation of the drive system 14 expressed by the following equation (7), and $\omega_W$ is a resonance frequency of the rotation of the wheel 12 expressed by the following equation (8). $\omega_D$ is a torsional resonance frequency, ie, anti-resonance frequency, of the drive shaft 32 expressed by the following equation (9), and $\zeta_W$ is a damping ratio in the rotational direction of the wheel 12 expressed by the following equation (10).

$$\omega_E = \sqrt{\frac{K_P}{I_P}} \quad (7)$$

-continued $$\omega_W = \sqrt{\frac{K_X r_0^2}{I_T}} \quad (8)$$

$$\omega_D = \sqrt{\frac{K_P (I_P + I_T)}{I_P I_T}} \quad (9)$$

$$\zeta_W = \frac{U}{3 P_X r_0} \sqrt{I_T K_X} \quad (10)$$

Figure 6:
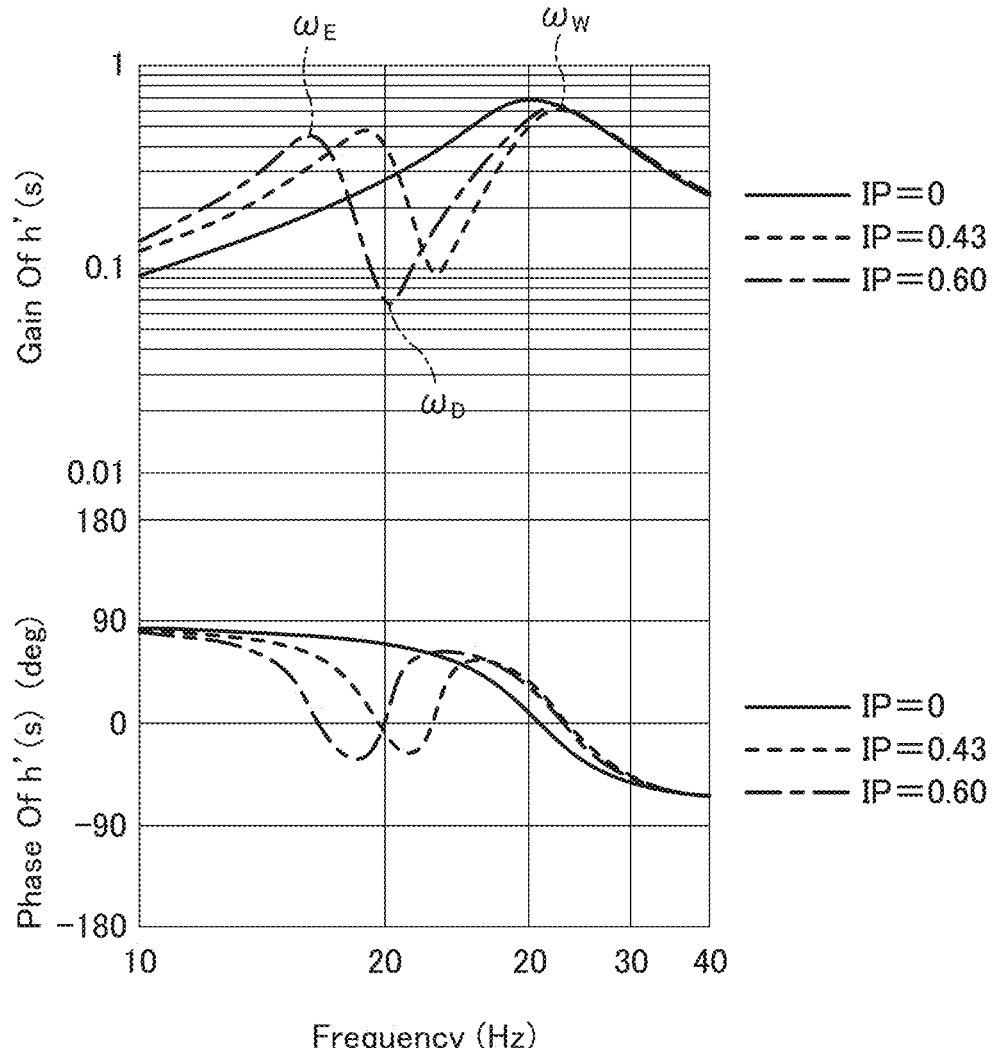
FIG. 6 is a diagram showing a relationship between gain of h'(s) (upper part) and frequency and a relationship between phase of h'(s) and frequency (lower part).

The upper part of FIG. 6 shows an example of a relationship between gain and frequency of h'(s), and the lower part of FIG. 6 shows an example of a relationship between phase and frequency of h'(s). In FIG. 6, a solid line, a broken line, and a dashed-dotted line indicate values when the equivalent moment of inertia $I_P$ of the drive system 14 is 0, 0.43, and 0.60, respectively.

From FIG. 6, it can be seen that as the equivalent moment of inertia $I_P$ increases, the gain of h'(s) increases and the phase of h'(s) lags in the frequency band of 10 to 20 Hz. Furthermore, it can be seen that the gain of h'(s) becomes minimum at the anti-resonant frequency $\omega_D$.

Figure 7:
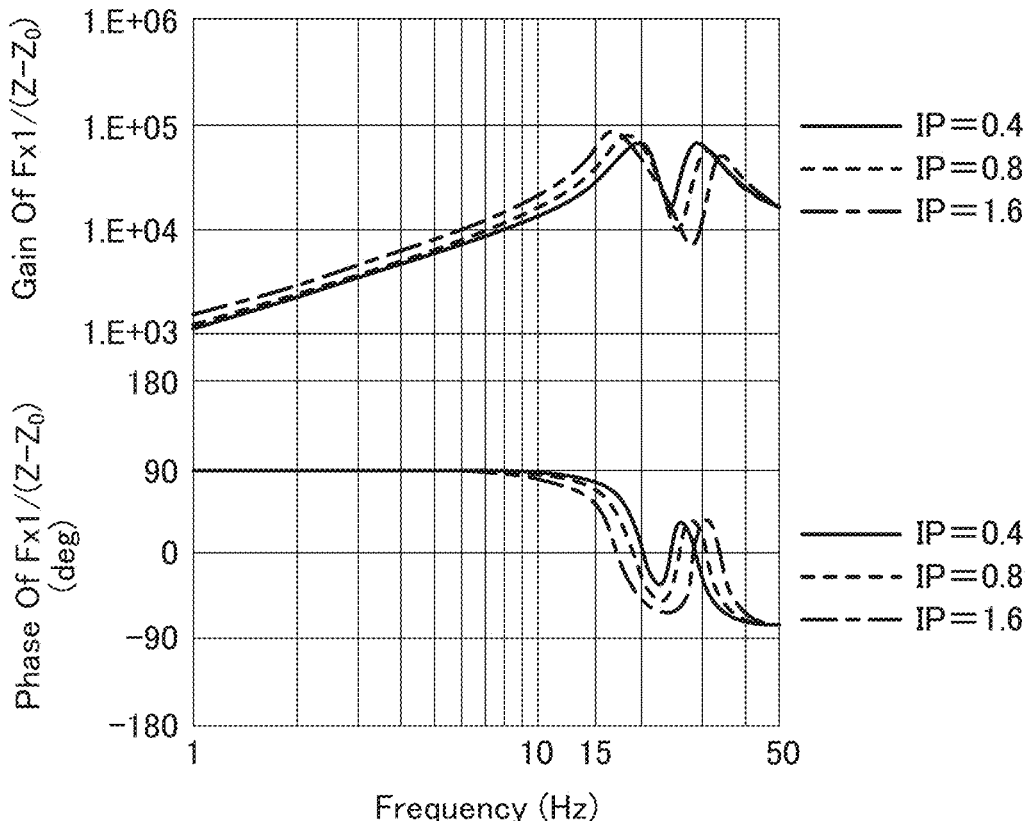
FIG. 7 is a diagram showing a relationship between gain and frequency of a transfer function from a deflection $Z$-$Z_0$ of a tire to a longitudinal force $F_{X1}$ (upper part) and a relationship between phase and frequency of a transfer function from the deflection $Z$-$Z_0$ of the tire to the longitudinal force $F_{X1}$ (lower part).

The upper part of FIG. 7 shows an example of a relationship between gain and frequency of a transfer function from a deflection $Z - Z_0$ of the tire 26 to the longitudinal force $F_{X1}$, and the lower part of FIG. 7 shows an example of a relationship between phase and frequency of a transfer function from the deflection $Z - Z_0$ to the longitudinal force $F_{X1}$. In FIG. 7, the solid line, broken line, and dashed-dotted line indicate values when the equivalent moment of inertia $I_P$ of the drive system 14 is 0.4, 0.8, and 1.6, respectively.

From FIG. 7, it can be seen that as the equivalent moment of inertia $I_P$ increases, in the frequency band of 10 to 20 Hz, the gain of the transfer function from the deflection $Z - Z_0$ to the longitudinal force $F_{X1}$ increases and the delay in the phase of the transfer function from the deflection $Z - Z_0$ to the longitudinal force $F_{X1}$ increases.

Figure 8:
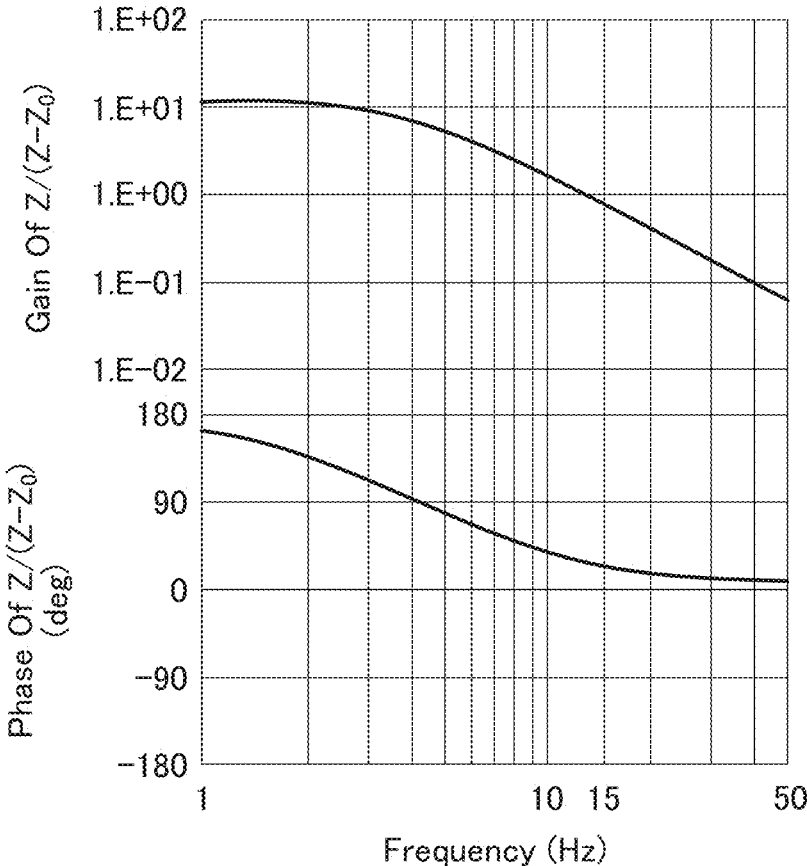
FIG. 8 is a diagram showing a relationship between gain and frequency of a transfer function from the deflection $Z$-$Z_0$ of the tire to a vertical displacement Z of a wheel (upper part) and a relationship between phase and frequency of the transfer function from the deflection $Z$-$Z_0$ of the tire to the vertical displacement Z of the wheel (lower part).

The upper part of FIG. 8 shows an example of a relationship between gain and frequency of a transfer function from the deflection $Z - Z_0$ of the tire 26 to a vertical displacement Z of the wheel 12, and the lower part of FIG. 8 shows an example of a relationship between phase and frequency of the transfer function from the deflection $Z - Z_0$ to the vertical displacement Z of the wheel 12. It can be seen from FIG. 8 that the gain and phase of the transfer function from the deflection $Z - Z_0$ to the vertical displacement Z of the wheel 12 decrease as the frequency increases.

Since an object to be controlled is the transfer function from the vertical displacement Z of the wheel 12 to the longitudinal force $F_{X1}$, the relationship between frequency and the gain and phase of the transfer function from the vertical displacement Z to the longitudinal force $F_{X1}$ is determined according to the following equation (11) based on the values in FIGS. 7 and 8.

$$\frac{F_X 1}{Z} = \frac{F_X 1}{Z - Z_0} \Big/ \frac{Z}{Z - Z_0} \quad (11)$$

Figure 9:
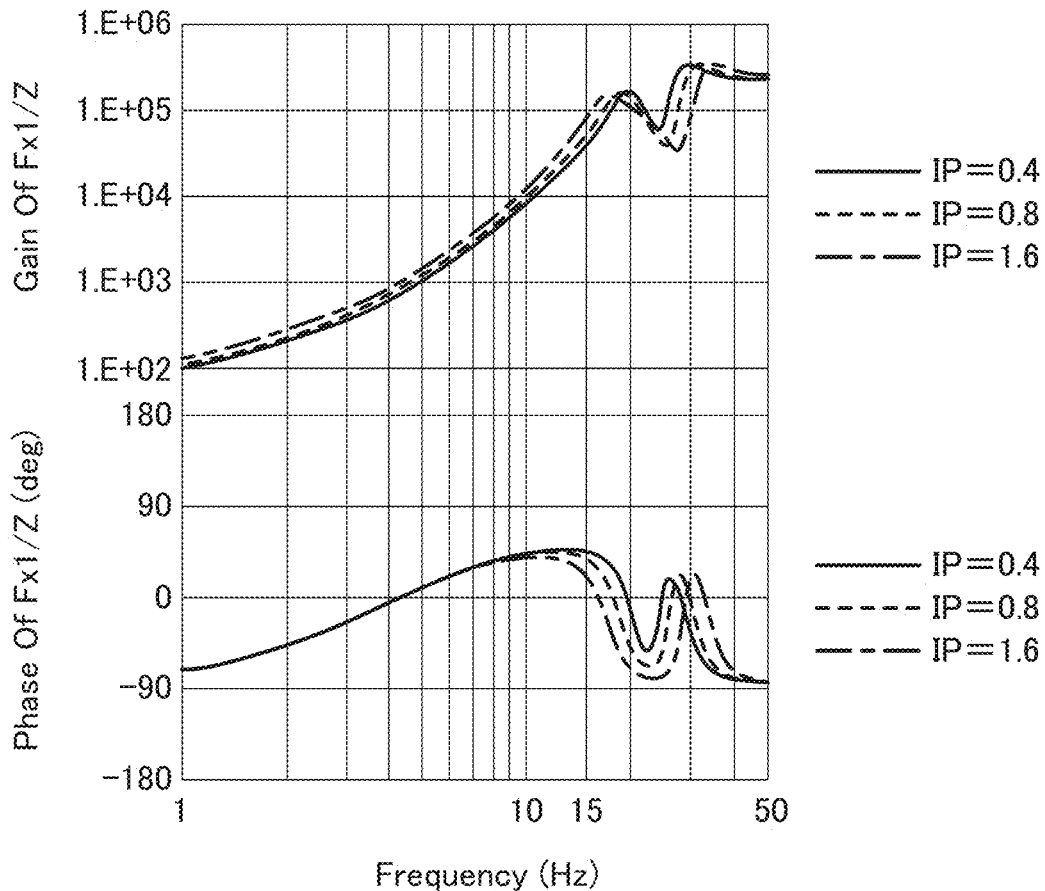
FIG. 9 is a diagram showing a relationship between frequency and gain of a transfer function from the vertical displacement Z of the wheel to the longitudinal force $F_{X1}$ (upper part) and a relationship between frequency and phase of the transfer function from the vertical displacement Z of the wheel to the longitudinal force $F_{X1}$ (lower part).

The upper part of FIG. 9 shows an example of a relationship between frequency and the gain of the transfer function from the vertical displacement Z to the longitudinal force $F_{X1}$, and the lower part of FIG. 9 shows an example of the relationship between frequency and the phase of the transfer function from the vertical displacement Z to the longitudinal force $F_{X1}$. In FIG. 9, the solid line, the broken line, and the dashed-dotted line indicate values when the equivalent moment of inertia $I_P$ of the drive system 14 is 0.4, 0.8, and 1.6, respectively.

Figure 10:
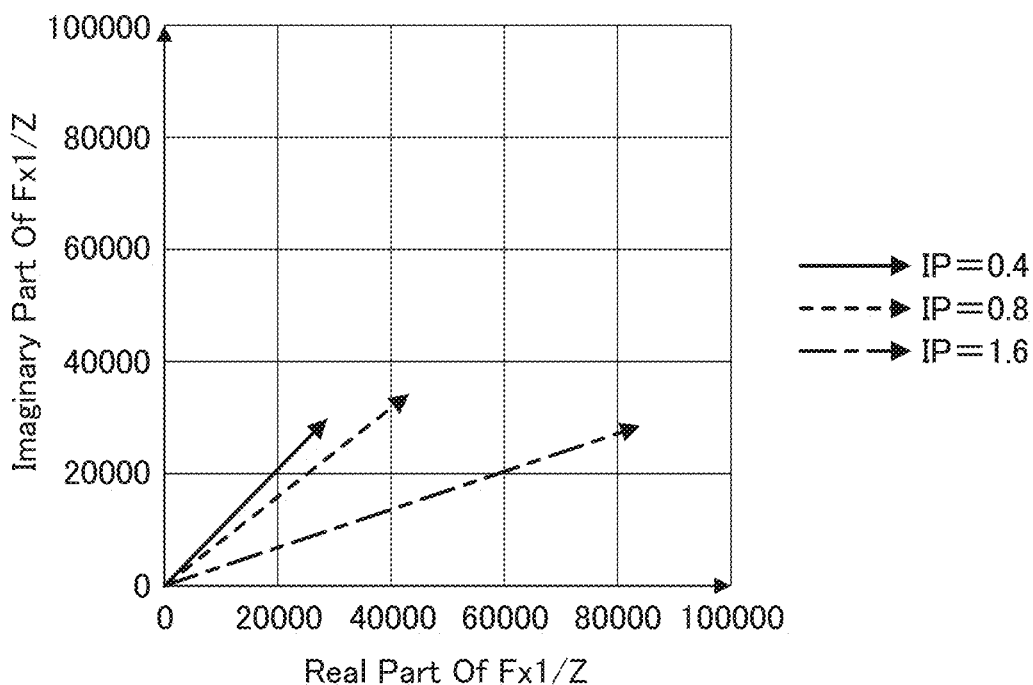
FIG. 10 is a vector diagram that displays $F_{X1}/Z$ of a vertical resonance frequency of the wheel divided into a real part and an imaginary part.

When $F_{X1}/Z$ at a vertical resonance frequency (15 Hz) of the wheel 12 as the unsprung is expressed as a vector based on FIG. 9 by dividing a real part, that is, a component proportional to the vertical displacement Z and an imaginary part, that is, a component proportional to a first-order differential value of the vertical displacement Z (vertical velocity), FIG. 10 is obtained. In FIG. 10, the solid line arrow, the broken line arrow, and the dashed-dotted arrow indicate vectors when the equivalent moment of inertia $I_P$ of the drive system 14 is 0.4, 0.8, and 1.6, respectively.

Figure 11:
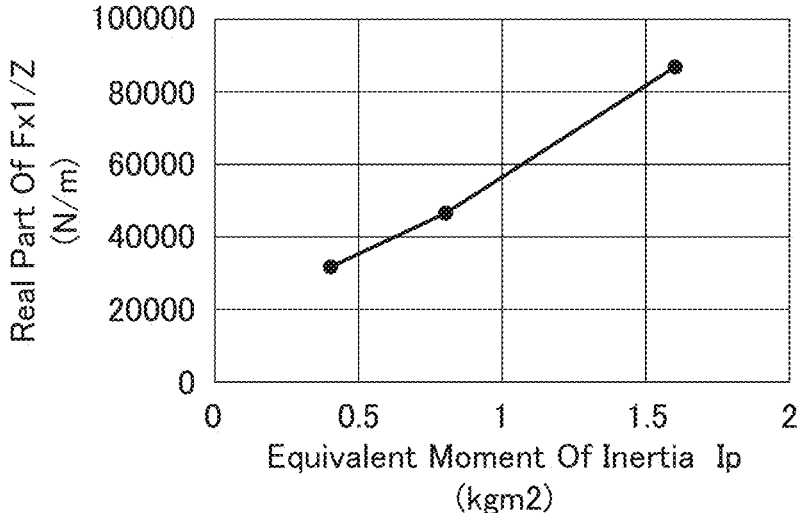
FIG. 11 is a diagram showing a relationship between the real part of the transfer function from the vertical displacement Z of the wheel to the longitudinal force $F_{X1}$ and a moment of inertia $I_P$ of a drive system.

FIG. 11 shows, based on FIG. 10, an example of a relationship between the real part of the transfer function from the vertical displacement Z to the longitudinal force $F_{X1}$ and the equivalent moment of inertia $I_P$ of the drive system 14. As can be seen from FIG. 11, the real part of the transfer function from the vertical displacement Z to the longitudinal force $F_{X1}$ increases as the equivalent moment of inertia $I_P$ of the drive system 14 increases.

The "longitudinal force $F_{X2}$ generated by the backward inclination of the locus 36" necessary to cancel the real part of the transfer function from the vertical displacement Z to the longitudinal force $F_{X1}$ (a component of the longitudinal force $F_{X1}$ proportional to the vertical displacement Z) is $\beta Z K_{SK}$. Since "the longitudinal force $F_{X2}$ generated by the backward inclination of the locus 36" per unit vertical displacement Z is $\beta K_{SK}$, the following equation (12) holds true. Notably, $K_{SK}$ is an elastic modulus of the suspension arm 16 in the direction along a phantom straight line connecting both ends of the suspension arm (for example, 1000000 N/m).

$$\beta K_{SK} = \text{Real part of transfer function} \qquad (12)$$
$$\text{from vertical displacement } Z \text{ to longitudinal force } F_{X1}$$

Therefore, an angle of the backward inclination of the locus 36 necessary to cancel the real part of the transfer function from the vertical displacement Z to the longitudinal force $F_{X1}$, that is, a target angle $\gamma t$ of the backward inclination, is expressed by the following equation (13) based on the above equation (12).

$$\gamma t = \beta = (\text{real part of transfer function from} \qquad (13)$$
$$\text{vertical displacement } Z \text{ to longitudinal force } F_{X1})/K_{SK}$$

Figure 12:
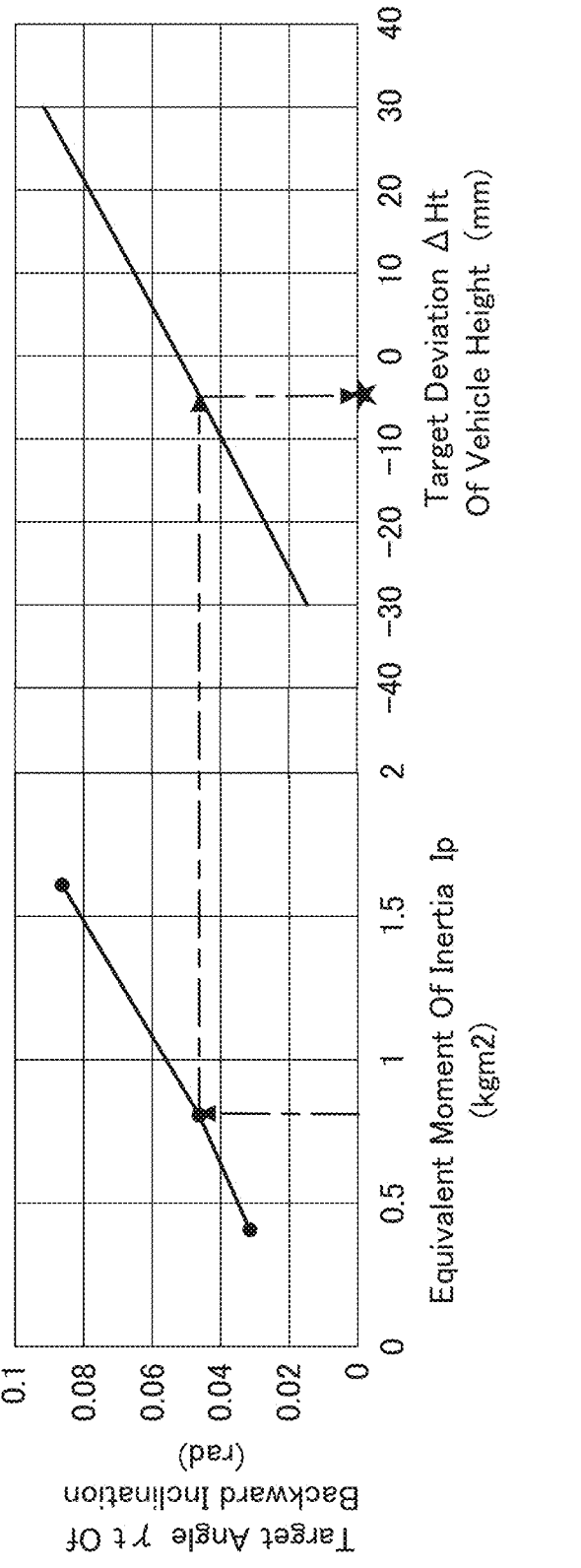
FIG. 12 is a diagram showing a relationship between a target angle $\gamma t$ of backward inclination of a locus of a wheel rotational axis and an equivalent moment of inertia $I_P$ of the drive system (left part) and a relationship between the target backward inclination angle $\gamma t$ of the locus and a target deviation $\Delta Ht$ of a vehicle height (right part).

The left half of FIG. 12 shows an example of a relationship between the target angle $\gamma t$ of the backward inclination of the locus 36 and the equivalent moment of inertia $I_P$ of the drive system 14 based on FIG. 11. As shown in the figure, the target angle $\gamma t$ of the backward inclination of the locus 36 increases as the equivalent moment of inertia $I_P$ of the drive system 14 increases. The right half of FIG. 12 shows a relationship between the target angle $\gamma t$ of the backward inclination of the locus 36 and a target deviation $\Delta Ht$ of the vehicle height. Notably, the target deviation $\Delta Ht$ of the vehicle height is a target value of a difference between a target vehicle height Ht and a preset standard vehicle height ($\Delta Ht=0$). As shown in FIG. 12, the smaller the equivalent moment of inertia $I_P$ of the drive system 14 is, the smaller the target angle $\gamma t$ of the backward inclination of the locus

36 is, and the smaller the target deviation $\Delta Ht$ of the vehicle height is, the smaller the target angle $\gamma t$ of the backward inclination of the locus 36 is. Therefore, the target vehicle height Ht becomes lower as the target backward inclination angle $\gamma t$ of the locus 36 becomes smaller, and accordingly, as the equivalent moment of inertia $I_P$ of the drive system 14 becomes smaller. In FIG. 12, the dashed-dotted line arrows show how to obtain the target deviation $\Delta Ht$ of the vehicle height H, and therefore the target vehicle height Ht, based on the equivalent moment of inertia $I_P$.

Figure 13A:
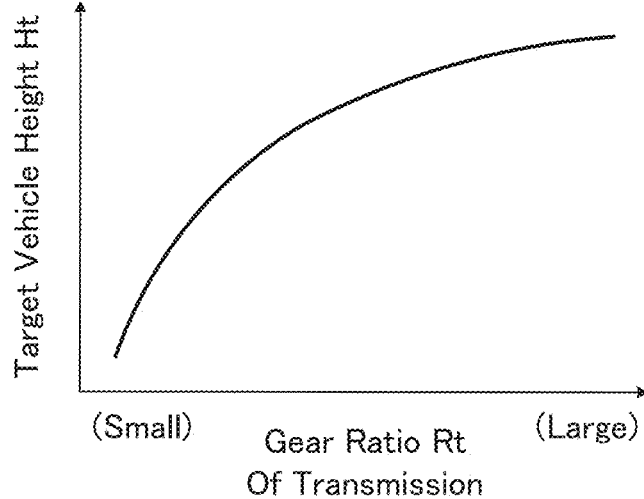
FIG. 13A is a diagram showing a relationship between gear ratio Rt and target vehicle height Ht.

FIG. 13A shows an example of a relationship between a gear ratio Rt of the transmission 30 and the target vehicle height Ht based on FIG. 12 and the relationship between the equivalent moment of inertia $I_P$ of the drive system 14 and the gear ratio Rt ($I_P$ is proportional to the square of Rt). As shown in FIG. 13A, the target vehicle height Ht is lower as the gear ratio Rt is smaller.

In the embodiment, the ROM of the vehicle height control ECU 50 stores a vehicle height control program and a map corresponding to FIG. 13A, that is, a map of the relationship between the gear ratio Rt and the target vehicle height Ht. The program corresponds to the flowchart shown in FIG. 14, and vehicle height control is executed according to this flowchart.

Vehicle Height Control Program in Embodiment

Next, the vehicle height control in the embodiment will be described with reference to the flowchart shown in FIG. 14. The vehicle height control according to the flowchart shown in FIG. 14 is repeatedly executed at predetermined intervals by the CPU of the vehicle height control ECU 50 while an ignition switch (not shown) is on.

First, in step S10, the CPU reads a signal indicating a gear ratio Rt of the transmission 30 from the drive system control ECU 48. As described above, the gear ratio Rt is the index indicating an equivalent moment of inertia $I_P$ of the drive system 14.

In step S20, the CPU determines a target vehicle height Ht by referring to the map corresponding to FIG. 13A based on the gear ratio Rt.

In step S30, the CPU controls the vehicle height adjustment device 42 so that a vehicle height H detected by the vehicle height sensor 46 becomes the target vehicle height Ht.

As can be seen from the above description, according to the embodiment, the rotational axis 24 of the wheel 12 draws a backwardly inclined locus 36 as the wheel moves up and down, so that a longitudinal force $F_{X1}$ acting on the wheel due to a vertical input from the road surface 40 is at least partially offset by a longitudinal force $F_{X2}$ generated by the backward inclination of the locus. The longitudinal force $F_{X1}$ that acts on the wheel due to vertical input from the road surface varies with changes in the equivalent moment of inertia $I_P$ of the drive system 14, but the vehicle height adjustment device 42 is controlled such that the smaller the equivalent moment of inertia, the lower the vehicle height.

Therefore, the longitudinal force $F_{X2}$ generated by the backward inclination of the locus can be changed in accordance with the change in the longitudinal force $F_{X1}$ acting on the wheel due to the change in the equivalent moment of inertia $I_P$ of the drive system 14. Accordingly, even if the equivalent moment of inertia of the drive system changes, a longitudinal force $F_{X1}+F_{X2}$ acting on the wheel can be effectively reduced, thereby effectively reducing a longitudinal force input from the wheel to the vehicle body.

In particular, according to the embodiment, the angle $\gamma$ of the backward inclination of the locus 36 and the angle $\alpha$ of the forward inclination of the shock absorber 18 are set such that the first longitudinal force $F_{X1}$ acting on the wheel due to the input from the road surface is at least partially offset by the second longitudinal force $F_{X2}$ generated by the backward inclination and the third longitudinal force $F_{X3}$ generated by a damping force of the shock absorber. The vehicle height adjustment device 42 is controlled such that a change in the backward inclination angle $\gamma$ of the locus that is required to offset a change in the first longitudinal force $F_{X1}$ due to the change in the equivalent moment of inertia $I_P$ of the drive system 14 by a change in the second longitudinal force $F_{X2}$ is achieved through a change in the vehicle height H.

Therefore, the vehicle height H can be controlled such that the backward inclination angle $\gamma$ of the locus 36 is changed by changing the vehicle height by an angle that is required to offset a change in the first longitudinal force $F_{X1}$ due to the change in the equivalent moment of inertia $I_P$ of the drive system 14 by a change in the second longitudinal force $F_{X2}$. Accordingly, the second longitudinal force can be changed by a change in the angle of backward inclination of the locus by changing the vehicle height such that even if the equivalent moment of inertia $I_P$ of the drive system changes due to a change in the gear ratio Rt of the transmission 30, the change in the first longitudinal force due to the change in the equivalent moment of inertia is offset by the change in the second longitudinal force.

Further, according to the embodiment, is stored the relationship (FIG. 13A or FIG. 13B) between the target vehicle height Ht and the index (gear ratio Rt or gear stage St) for achieving, by adjusting the vehicle height H, a change in the angle $\gamma$ of the backward inclination of the locus 36 necessary to offset the change in the first longitudinal force $F_{X1}$ due to the change in the equivalent moment of inertia $I_P$ by the change in the second longitudinal force $F_{X2}$. Further, a target vehicle height is determined from the above relationship based on the index, and the vehicle height adjustment device 42 is controlled so that the vehicle height becomes the target vehicle height.

Therefore, by controlling the vehicle height adjustment device 42 so that the vehicle height becomes the target vehicle height, the second longitudinal force can be changed such that even if the equivalent moment of inertia $I_P$ of the drive system 14 changes, the change in the first longitudinal force due to the change in the equivalent moment of inertia is offset by the change in the second longitudinal force.

As described above, the equivalent moment of inertia $I_P$ of the drive system 14 is proportional to the square of the gear ratio Rt of the transmission 30, and becomes smaller as the gear ratio of the transmission is smaller. According to the embodiment, the relationship between the target vehicle height and the index is the relationship (FIG. 13A) between the target vehicle height Ht and the gear ratio Rt of the transmission, which is set such that the smaller the gear ratio of the transmission, the lower the vehicle height. Therefore, even if the equivalent moment of inertia $I_P$ of the drive system 14 changes with a change in the gear ratio of the transmission, the vehicle height can be controlled so that the smaller the equivalent moment of inertia, the lower the vehicle height.

Further, according to the embodiment, the shock absorber 18 is arranged to be inclined forward at the angle $\alpha$. The angle $\gamma$ of the backward inclination of the locus 36 and the angle $\alpha$ of the forward inclination are set such that the first longitudinal force $F_{X1}$ is at least partially offset by the second longitudinal force $F_{X2}$ generated by the backward inclination of the locus and the third longitudinal force $F_{X3}$ generated by the damping force of the shock absorber 18. Therefore, even if the equivalent moment of inertia of the drive system changes, a change in the longitudinal force $F_{X1}+F_{X2}+F_{X3}$ acting on the wheel can be effectively reduced as compared to where the shock absorber 18 is arranged without inclining forward.

Although the present disclosure has been described in detail with reference to the specific embodiment, it will be apparent to those skilled in the art that the present disclosure is not limited to the above-described embodiment, and various other embodiments are possible within the scope of the present disclosure.

For example, in the above-described embodiment, the relationship between the index indicating the equivalent moment of inertia $I_P$ of the drive system 14 and the target vehicle height Ht is the relationship between the gear ratio Rt of the transmission 30 and the target vehicle height Ht (FIG. 13A). However, in a vehicle height control device applied to a vehicle in which the transmission 30 is a multi-stage transmission, the relationship between the index and the target vehicle height Ht may be a relationship between the gear stage St of the transmission 30 and the target vehicle height Ht (modified example). In that case, the relationship between the gear stage St and the target vehicle height Ht is set such that the higher the gear stage, the lower the target vehicle height, as shown in FIG. 13B, for example.

Figure 13B:
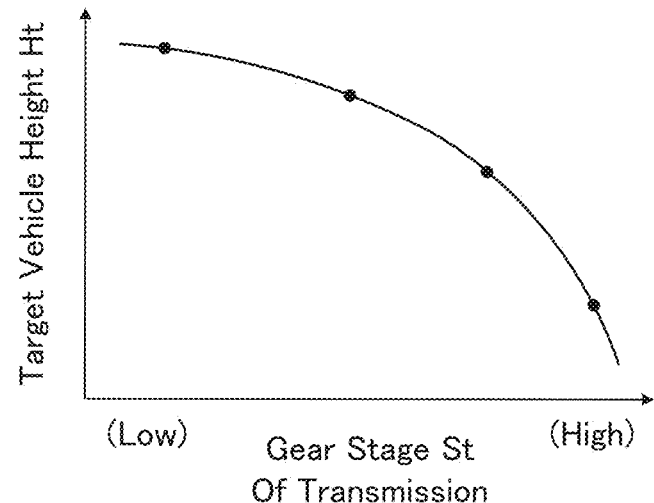
FIG. 13B is a diagram showing a relationship between gear stage St and the target vehicle height Ht.

FIG. 13B shows an example of a relationship between a gear stage St of the transmission 30 and the target vehicle height Ht based on FIG. 12 and the relationship between the equivalent moment of inertia $I_P$ of the drive system 14 and the gear stage St of the transmission 30. Notably, in FIG. 13B, the black circles are examples of the positions of the gear stages. In addition, in the modified example, in step S10 in FIG. 14, a signal indicating a gear stage St is read, and in step S20, by referring to a map corresponding to FIG. 13B based on the gear stage St, a target vehicle height Ht is determined.

Since the gear ratio Rt of the transmission 30 becomes smaller as the gear stage St of the transmission becomes higher, the equivalent moment of inertia $I_P$ of the drive system 14 becomes smaller as the gear stage of the transmission becomes higher. According to the modified example, the higher the gear stage St of the transmission 30, the lower the target vehicle height Ht. Therefore, even if the equivalent moment of inertia $I_P$ of the drive system 14 fluctuates as the gear stage of the transmission changes, the vehicle height can be controlled so that the smaller the equivalent moment of inertia, the lower the vehicle height.

Furthermore, in the embodiment described above, the shock absorber 18 is arranged between the wheel carrier 22 and the vehicle body 34 in a forwardly inclined state. However, the shock absorber 18 may be arranged without inclining forward.

What is claimed is:

1. A vehicle height control device applied to a vehicle equipped with a wheel that is rotatably supported about a rotational axis by a wheel carrier and has a tire, a drive system that rotationally drives the wheel by a drive source via a transmission, and a suspension arm that is arranged between the wheel carrier and a vehicle body, wherein the suspension arm is arranged to define a suspension geometry in which the rotational axis, when viewed in the lateral direction of the vehicle, draws a locus that is inclined backward as the wheel moves up and down; the vehicle height control device includes a vehicle height adjustment device configured to change a vehicle height, and an electronic control unit that controls the vehicle height adjustment device, the electronic control unit is configured to acquire information on an index indicating an equivalent moment of inertia of the drive system, and control the vehicle height adjustment device such that the smaller the equivalent moment of inertia indicated by the index, the lower the vehicle height.

2. A vehicle height control device applied to a vehicle equipped with a wheel that is rotatably supported about a rotational axis by a wheel carrier and has a tire, a drive system that rotationally drives the wheel by a drive source via a transmission, and a suspension arm that is arranged between the wheel carrier and a vehicle body, wherein the suspension arm is arranged so that the rotational axis, when viewed in the lateral direction of the vehicle, draws a locus that is inclined backward as the wheel moves up and down; the vehicle height control device includes a vehicle height adjustment device configured to change a vehicle height, and an electronic control unit that controls the vehicle height adjustment device, the electronic control unit is configured to acquire information on an index indicating an equivalent moment of inertia of the drive system, and control the vehicle height adjustment device such that the smaller the equivalent moment of inertia indicated by the index, the lower the vehicle height, wherein an angle of the backward inclination of the locus is set such that a first longitudinal force acting on the wheel due to vertical input from a road surface is at least partially offset by a second longitudinal force generated by the backward inclination of the locus, and the electronic control unit is configured to control the vehicle height adjustment device such that a change in the angle of backward inclination of the locus necessary to offset a change in the first longitudinal force due to a change in the equivalent moment of inertia by a change in the second longitudinal force is achieved by a change in the vehicle height.

3. The vehicle height control device according to claim 2, wherein the electronic control unit stores a relationship between a target vehicle height and the index for achieving, by controlling the vehicle height, a change in the angle of backward inclination of the locus that is necessary to offset a change in the first longitudinal force due to a change in the equivalent moment of inertia by a change in the second longitudinal force.

4. The vehicle height control device according to claim 3, wherein the index is a gear ratio of the transmission, and the relationship is a relationship between a target vehicle height and a gear ratio of the transmission which is set such that the smaller the gear ratio of the transmission, the lower the target vehicle height.

5. The vehicle height control device according to claim 3, wherein the transmission is a multi-stage transmission, the index is a gear stage of the transmission, and the relationship is a relationship between a target vehicle height and a gear stage of the transmission which is set such that the higher the gear stage of the transmission, the lower the target vehicle height.

* * * * *